United States Patent [19]

Ibamoto et al.

[11] 4,032,833
[45] June 28, 1977

[54] CHOPPER CONTROL DEVICE

[75] Inventors: Masahiko Ibamoto; Hisakatsu Kiwaki, both of Katsuta, Japan

[73] Assignee: Hitachi, Ltd., Japan

[22] Filed: Jan. 27, 1975

[21] Appl. No.: 544,269

[30] Foreign Application Priority Data

Feb. 6, 1974 Japan .......................... 49-14454

[52] U.S. Cl. .................. 363/78; 307/240;
318/227; 323/89 C; 323/89 M; 323/120;
363/124; 363/90
[51] Int. Cl.² ............... H02M 7/44; H02P 13/18
[58] Field of Search ............ 323/6, 92, 103, 109,
323/116, 94 H, 57, 89 H, 89 C, 89 M, 120;
321/40, 2, 43, 44; 307/240; 318/227

[56] References Cited

UNITED STATES PATENTS

| 2,696,583 | 12/1954 | Brown | 321/40 |
| 2,707,764 | 5/1955 | Mittag | 321/40 |
| 2,964,693 | 12/1960 | Ehret | 323/92 X |
| 3,423,687 | 1/1969 | Abe et al. | 323/89 C |

FOREIGN PATENTS OR APPLICATIONS 140,438  5/1948  Australia .......................... 323/92

*Primary Examiner*—Gerald Goldberg
*Attorney, Agent, or Firm*—Craig & Antonelli

[57] ABSTRACT

In a chopper control device in which a magnetic phase shifter is used for providing chopper turn-on and turn-off signals, an external magnetic field is applied to the core of the magnetic phase shifter so as to carry out the notching control of a motor by regulating the residual phase angle of the output of the magnetic phase shifter.

6 Claims, 10 Drawing Figures

CHOPPER CONTROL DEVICE

BACKGROUND OF THE INVENTION

This invention relates to a chopper control device utilizing a magnetic phase shifter and more particularly to a chopper control device of the kind above described which is capable of limiting the phase angle of the output of the magentic phase shifter depending on the intensity of an external magnetic field applied thereto.

A magnetic amplifier can singly carry out various operations including comparison, amplification, wave shaping and time constant regulation of various signals and can operate without being substantially adversely affected by external noises. Thus, a magnetic amplifier is suitable for use as a means for controlling a chopper which controls the on-off state of a large current. A thyristor chopper control device is commonly known in which such magnetic amplifier is used as a phase controller or magnetic phase shifter. A pair of magnetic phase shifters have been generally required hitherto for the purpose of notch setting control, for example, for electric motors used in electric cars. However, the magnetic phase shifters are quite expensive and the circuit including one pair of such magnetic phase shifters is quite complex in circuitry tending to give rise to reductions of reliability.

SUMMARY OF THE INVENTION

It is an object of the present invention to provide a novel and improved chopper control device which employs an inexpensive and highly reliable magnetic phase shifter as a chopper gate control means.

Another object of the present invention is to provide a chopper control device in which a magnetic phase shifter of contactless or notch-less structure is employed for the phase angle limiting control so as to enhance the reliability of operation.

The chopper control device according to the present invention is featured by the fact that an iron core, whose magnetic saturation level with magnetic flux is equivalently controlled by an externally applied magnetic field, is employed to constitute a part of a magnetic phase shifter so that the magnetic phase shifter can singly function as both a current limiting means and a phase angle limiting means.

DESCRIPTION OF THE PREFERRED EMBODIMENTS

Figure 1:
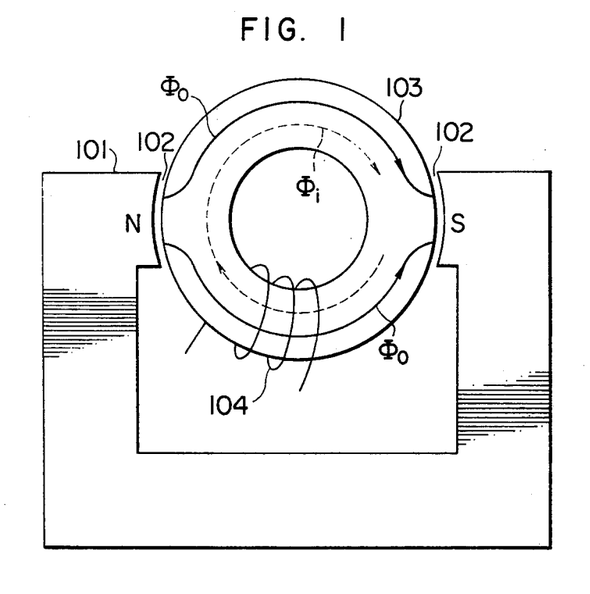
FIG. 1 is a diagrammatic view showing the manner of applying an external magnetic field to an iron core and the state of magnetic flux in the iron core in a basic form of a magnetic phase shifter employed in the present invention.

FIG. 1 shows the basic principle of a magnetic phase shifter employed in the present invention. Referring to FIG. 1, an external magnetic field providing magnetic flux $\Phi o$ is applied to an iron core 103 by a magnet 101 through an air gap 102. A coil 104 is wound around a portion of the iron core 103 to produce circulating magnetic flux $\Phi i$ in the iron core 103. In the upper half of the iron core 103, the magnetic flux $\Phi i$ is added to the magnetic flux $\Phi o$, and saturation occurs when the magnetic flux $\Phi i$ reaches such a value as to satisfy the equation $|\Phi o + \Phi i| = \Phi s$, in which $\Phi s$ represents the saturated magnetic flux. In the lower half of the iron core 103, no saturation occurs due to the fact that the resultant magnetic flux in this portion is in the state $|\Phi o - \Phi i| < \Phi s$. Since saturation occurs in the upper half of the iron core 103, the magnetic flux $\Phi i$ cannot increase any more in this portion, and therefore, no change in the magnetic flux can occur also in the lower half of the iron core 103.

When the direction of the circulating magnetic flux $\Phi i$ produced by the coil 104 is reversed, the magnetic flux $\Phi i$ is added now to the magnetic flux $\Phi o$ in the lower half of the iron core 103, and saturation occurs in this portion when the resultant magnetic flux in this portion becomes $|\Phi o + \Phi i| = \Phi s$. In this manner, no change in the magnetic flux can occur in the upper half of the iron core 103. It will thus be seen that the magnetic saturation level of the iron core 103 is equivalently changed from $\Phi s$ to $(\Phi s - \Phi o)$ when the external magnetic field $\Phi o$ is applied to the iron core 103 in the manner above described. Since the external magnetic field is applied to the iron core 103 forming a closed magnetic path through the air gap 102, no reaction of the coil 104 against the external magnetic field occurs so as to make the external magnetic field a constant magnetic flux source.

Figure 2:
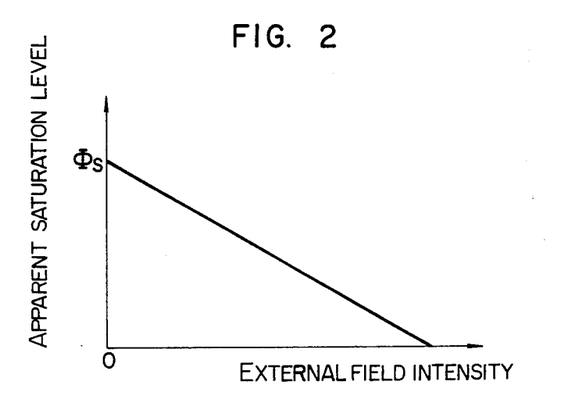
FIG. 2 is a graphic representation of the relation between the intensity of the external magnetic field applied to the iron core and the magnetic saturation level of the iron core.

FIG. 2 shows variations of the apparent magnetic saturation level relative to variations of the intensity of the externally applied magnetic field. It will be seen from FIG. 2 that the saturation level of the iron core 103 can be equivalently controlled by varying the intensity of the externally applied magnetic field.

Figure 3:
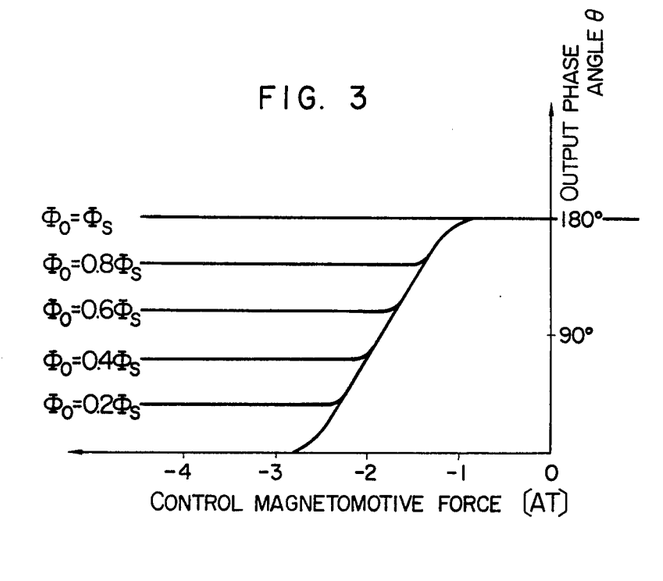
FIG. 3 shows variations of the controlling characteristic of the external magnetic field controlled magnetic phase shifter relative to variations in the density of the externally applied magnetic flux.
Figure 4:
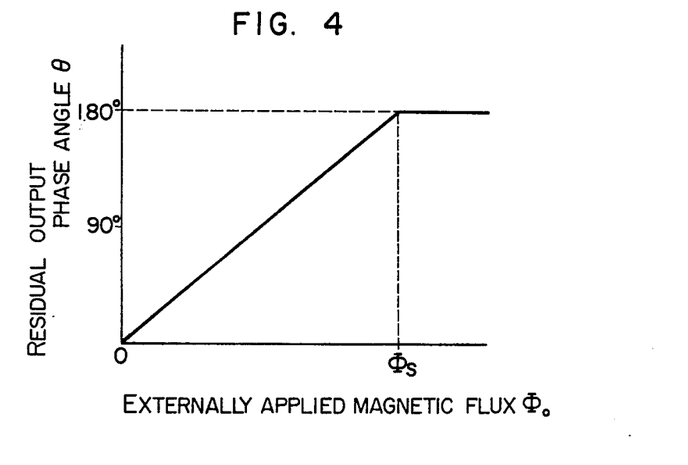
FIG. 4 is a graphic representation of the relation between the intensity of the externally applied magnetic field and the phase angle of the residual output of the external magnetic field controlled magnetic phase shifter.

Therefore, when a magnetic phase shifter is constituted employing the iron core whose saturation level is equivalently controlled by the externally applied magnetic field, such magnetic phase shifter can be placed in any desired overexcited state. This magnetic phase shifter has an operating characteristic as shown in FIG. 3. The output phase angle $\theta$ represented by each of the horizontal lines in FIG. 3, namely the output phase angle of the magnetic phase shifter when the shifter is in the overexcited state, which is referred to hereinafter as a residual phase angle, varies linearly relative to the intensity of the externally applied magnetic field as shown in FIG. 4.

Figure 5:
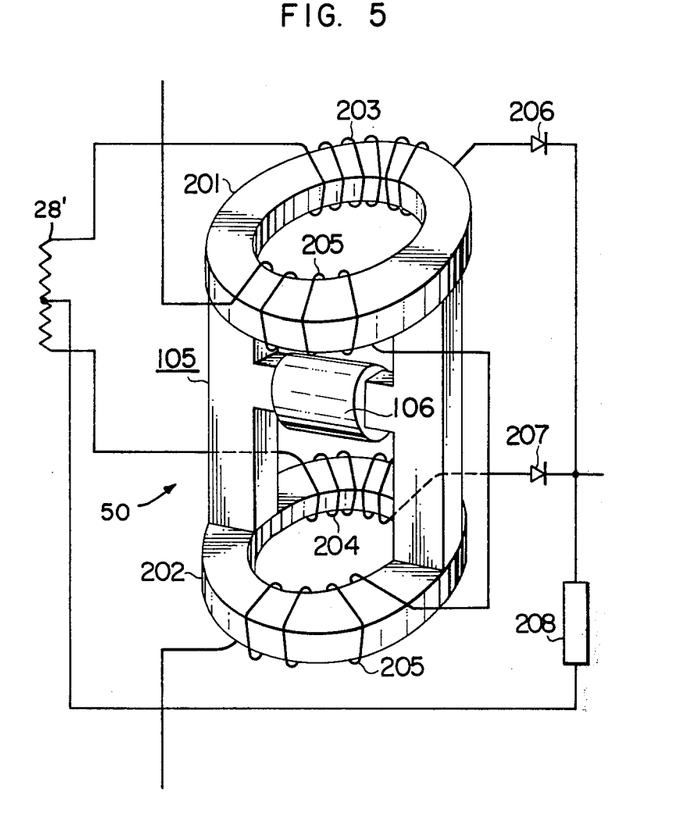
FIG. 5 shows the structure and associated circuit of one practical form of the external magnetic field controlled magnetic phase shifter.

FIG. 5 shows one practical form of such external magnetic field controlled magnetic phase shifter 50 which is constructed so that the residual phase angle can be controlled by the externally applied magnetic field. Referring to FIG. 5, an electromagnet 105 having a coil 106 applies an external magnetic field when energized to a pair of spaced iron cores 201 and 202 of the magnetic phase shifter. In FIG. 5, the electromagnet 105 is used in common to both the iron cores 201 and 202. The magnetic phase shifter is provided with a pair of output windings 203 and 204, a control winding 205, a pair of feedback rectifiers 206 and 207, and an output resistor 208. The rectifier 206 serves to allow a current to pass through the circuit including the output winding 203, the rectifier 206 and the resistor 208 during one half of a cycle of the a.c. signal produced by a coil 28′ of a magnetic multivibrator and the rectifier 207 serves to allow a current to pass through the circuit including the output winding 204, the rectifier 207 and the resistor 208 during the other half of the cycle of the same a.c. signal. Feedback windings which are not shown for purposes of clarity may be wound on the respective cores 201 and 202 for the purpose which will be described with reference to FIG. 6.

Figure 6:
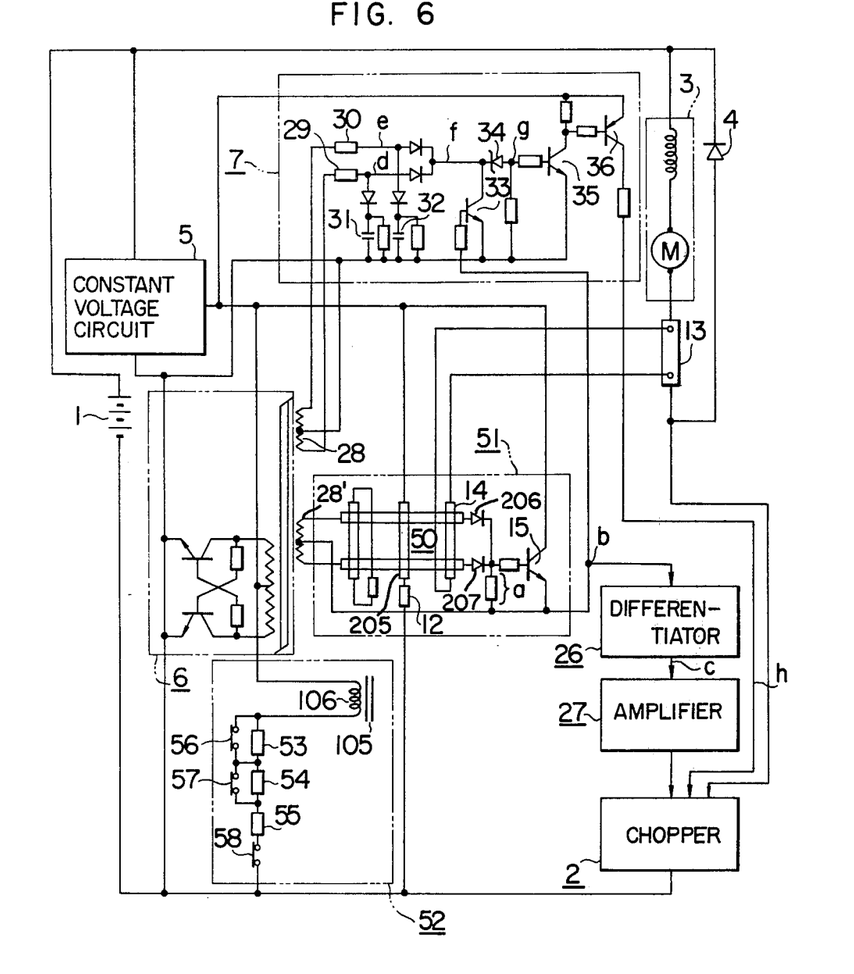
FIG. 6 is a circuit diagram of an embodiment of the chopper control device according to the present invention.

FIG. 6 shows an embodiment of the thyristor chopper control device of the present invention employing a magnetic phase shifter having a structure as above described. Referring to FIG. 6, power supply voltage of a battery 1 is regulated by a chopper 2 to be applied to a d.c. series motor 3. A free-wheel diode 4 is provided for smoothing the motor current. The other components shown in FIG. 6 constitute a gate control circuit for the control of the duty cycle of the chopper 2. The duty cycle means the ratio of chopper-on time to total time of one cycle of chopper on and off. The power supply voltage of the battery 1 is converted into a suitable voltage by a constant voltage circuit 5 which serves as a d.c. power supply for the gate control circuit.

A known Royer type magnetic multivibrator 6 generates an a.c. voltage of rectangular waveform having a constant frequency to serve as an a.c. power supply for a turn-on signal generator 7 and an external magnetic field controlled magnetic phase shifter 50 in a current-voltage control circuit 51. A notch instruction signal generator 52 is provided to apply an external magnetic field to the external magnetic field controlled magnetic phase shifter 50. This external magnetic field controlled magnetic phase shifter 50 has a phase angle limiting function as shown in FIG. 3, and the current-voltage control circuit 51 has therefore both a current limiting function and a phase angle limiting function.

Figure 7:
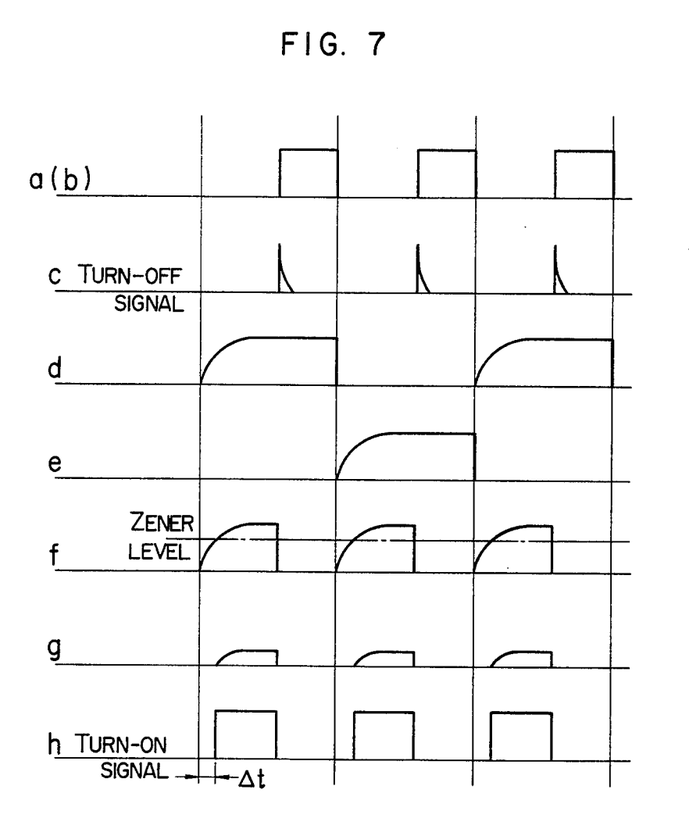
FIG. 7 shows voltage waveforms appearing at various parts of FIG. 6.

The operation of the chopper control device shown in FIG. 6 will be described with reference to FIG. 7 showing voltage waveforms appearing at various parts of FIG. 6. The symbols $a$ to $h$ in FIG. 7 correspond to the same symbols $a$ to $h$ in FIG. 6 and represent the voltage waveforms appearing at the corresponding parts of FIG. 6.

The notch instruction signal generator 52 applies a notch instruction signal to a control winding of the magnetic phase shifter 50 through a resistor 12. A portion of the motor current is derived by voltage dividing resistor means 13 to be fed back to a feedback winding 14 of the magnetic phase shifter 50, and the magnetomotive force induced in the feedback winding 14 is compared with the magnetomotive force induced in the control winding by the notch instruction signal. Consequently, the phase of the output $a$ (shown in FIG. 7 as a waveform $a$) of the magnetic phase shifter 50 is controlled so that both these magnetomotive forces can be made to be equal to each other, that is, the motor current value can be made to be equal to the instructed value. A transistor switch 15 is turned on in response to the application of the output $a$ of the magnetic phase shifter 50. The output $b$ (shown in FIG. 7 as a waveform $b$) of this transistor switch 15 is applied to a differentiator 26. The output $c$ (shown in FIG. 7 as a waveform $c$) of this differentiator 26 is amplified by an amplifier 27 to be applied to the chopper 2 as a turn-off signal.

A.c. voltages of rectangular waveform having phases opposite to each other are derived from an output coil 28 of the magnetic multivibrator 6 to be alternately applied to an integrator consisting of a resistor 29 and a capacitor 31 and to another integrator consisting of a resistor 30 and a capacitor 32. The outputs $d$ and $e$ of the respective integrators have waveforms $d$ and $e$ as shown in FIG. 7.

A transistor switch 33 is responsive to the output $b$ of the transistor switch 15 so that a waveform $f$ as shown in FIG. 7 can be obtained by offsetting the composite waveform of the outputs $d$ and $e$ of the two integrators by the output of the transistor 33. This waveform $f$ is applied to a Zener diode 34 so that the portion lower than the Zener level can be removed. As a result, a voltage waveform $g$ which lags in phase relative to the waveform $f$ appears from the Zener diode 34 as shown in FIG. 7. This waveform $g$ is subjected to wave shaping and amplification by a pair of transistors 35 and 36 to be applied to the chopper 2 as a turn-on signal $h$ having a waveform $h$ as shown in FIG. 7. The phase of the turn-on signal $h$ is selected to lag behind that of the waveform $f$ by $\Delta t$ as shown in the waveform $h$ of FIG. 7 so that this turn-on signal may not appear within the commutating period. However, when the chopper is of the type in which the turn-on signal may appear in a very short time after the appearance of the turn-off signal, the means including the integrators for providing this phase lag may be eliminated.

In the notch-off state of the master controller, full current is supplied to the coil 106 of the electromagnet 105 in the notch instruction signal generator 52 which applies the external magnetic field to the external magnetic field controlled magnetic phase shifter 50, and a 100% output appears from the magnetic phase shifter 50 which is saturated by the full external magnetic field applied thereto. Consequently, the transistor switch 33 is turned on and the turn-on signal $h$ cannot appear. Thus, in this state, the chopper 2 is not turned on.

When the notch is advanced to the first notch position, a normally-closed switch 56 is opened and the current supplied to the coil 106 of the electromagnet 105 is decreased to reduce the intensity of the external magnetic field applied to the magnetic phase shifter 50 so that the output phase of the magnetic phase shifter 50 can be reduced to about 70% of the full output phase. The turn-on signal blocking action by the transistor switch 33 is relieved by the corresponding extent, namely by the extent of about 30%, and the chopper 2 starts to operate to permit supply of main current to the motor 3. In the initial stage of the motor operation, few substantial counter electromotive force is induced in the motor 3, and current having a value nearly equal to the limit current value flows through the motor 3 although the duty factor of the chopper 2 is small. In this stage of the motor operation, a corresponding magnetomotive force is induced in the feedback winding of the magnetic phase shifter 50, and the output phase of the magnetic phase shifter 50 varies to a suitable value to substantially maintain the motor current at the limit current value.

As the rotating speed of the motor 3 is increased to increase the counter electromotive force induced therein, the duty cycle of the chopper 2 has to be increased so as to maintain the motor current constant substantially at the limit current value. However, due to the fact that the output of the magnetic phase shifter 50 cannot be reduced to less than 70% of the full output, the motor operation is changed over from the constant current operation mode to the constant voltage operation mode in the first notch position as shown in FIG. 8 as the range of "PHASE ANGLE LIMITED AT 1ST NOTCH POSITION".

Figure 8:
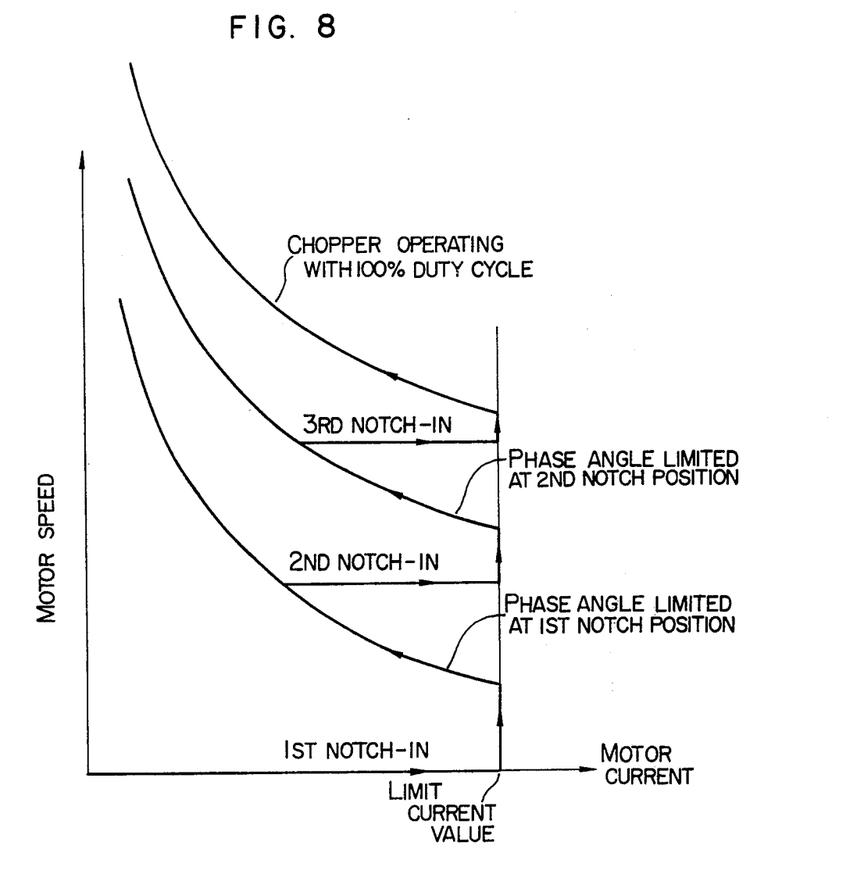
FIG. 8 is a graphic representation of the relation between the current and the rotating speed of a motor at various notch positions.

Then, when the notch is advanced to the second notch position, as shown in FIG. 8 as the range of "2ND NOTCH-IN" a normally-closed switch 57 is opened and the motor operation is in turn changed over to the constant voltage operation mode in the second notch position as shown in FIG. 8 as the range of "PHASE ANGLE LIMITED AT 2ND NOTCH POSITION" via the constant current operation mode in entirely the same manner as that above described.

When subsequently the notch is advanced to the third notch position, a normally-closed switch 58 is opened and no external magnetic field is applied to the magnetic phase shifter 50. In this stage, the magnetic phase shifter 50 functions merely as a current limiting means. When the rotating speed of the motor 3 is increased to an extent that the motor current cannot be maintained constant even at a maximum duty cycle of the chopper, the current feedback is reduced until finally no output appears from the magnetic phase shifter 50. As a result, the turn-off signal c disappears with the disappearance of the output of the magnetic phase shifter 50, and the turn-on signal h can appear alone so that to place the chopper 2 can operate with the 100% duty cycle. The relation between the motor current and the rotating speed of the motor is shown in FIG. 8 as the range of "CHOPPER OPERATING WITH 100% DUTY CYCLE".

It will be understood from the foregoing description that the chopper control device according to the present invention provides a very great economical advantage in that a special magnetic phase shifter is not required for the phase angle limiting control, and an inexpensive electromagnet is merely combined with a current limiting magnetic phase shifter of simple construction to apply an external magnetic field to the magnetic phase shifter. The intensity control of the external magnetic field applied to the magnetic phase shifter may be done by suitably adjusting the air gap instead of adjusting the current supplied to the coil of the electromagnet. This provides another advantage in that a contactless chopper control device can be obtained and the reliability can be further improved.

Although the electromagnet for applying the external magnetic field to the magnetic phase shifter is used in common to the two iron cores in the form shown in FIG. 5, it is needless to say that a pair of such electromagnets may be provided for the respective iron cores.

Figure 9:
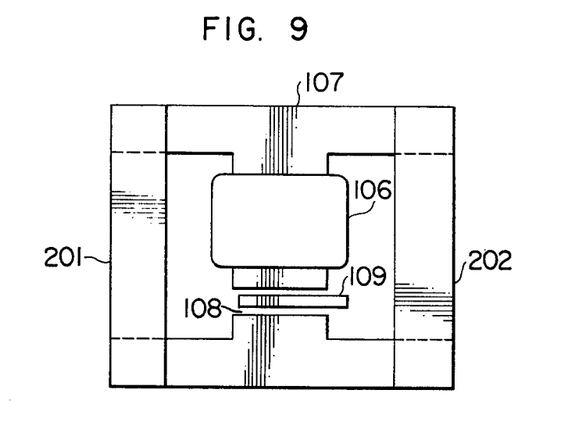
FIGS. 9 and 10 are diagrammatic views showing other manners of applying an external magnetic field to the magnetic phase shifter.

The coil current of the electromagnet may be maintained constant and the reluctance may be varied. Such a method is shown in FIG. 9. Referring to FIG. 9, a control gap 108 is formed in a portion of an electromagnet 107 having a coil 106, and an element such as a plate of iron 109 is movably disposed in this control gap 108 for varying the reluctance of the magnetic circuit of the electromagnet 107. In this manner, the amount of magnetic flux passing through the iron core of the magnetic phase shifter can be varied to control the operation characteristic of the magnetic phase shifter.

Figure 10:
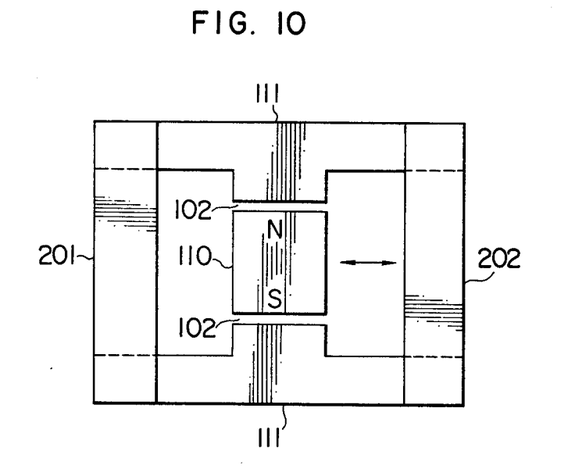

It is readily apparent to those skilled in the art that the external magnetic field may be applied by a permanent magnet in lieu of the electromagnet. An arrangement as shown in FIG. 10 may be employed in such a case. Referring to FIG. 10, a permanent magnet 110 is disposed between a pair of split yokes 111 so as to be movable in a direction as shown by the arrow or rotatable relative to the yokes 111. In this manner, the effective area of the permanent magnet 110 opposite to the yokes 111 can be varied to vary the amount of magnetic flux passing through the iron core of the magnetic phase shifter so that the operating characteristic of the magnetic phase shifter can be controlled.

We claim:

1. A chopper control device for controlling a duty cycle of a chopper, said device comprising a magnetic phase shifter having an iron core arrangement, said magnetic phase shifter including a control winding and a feedback winding each being wound around a portion of said iron core arrangement, the output of said magnetic phase shifter being utilized to provide a gate signal for controlling the duty cycle of said chopper, wherein said device further comprises means associated with said iron core arrangement of said magnetic phase shifter for applying an external magnetic field thereto, and means for regulating the intensity of the external magnetic field.

2. A chopper control device as claimed in claim 1, wherein said external magnetic field applying means comprises an electromagnet including an iron core connected to said iron core arrangement of said magnetic phase shifter.

3. A chopper control device as claimed in claim 2, wherein said external magnetic field intensity regulating means comprises resistor means for regulating the current supplied to the coil of said electromagnet.

4. A chopper control device as claimed in claim 1, wherein said external magnetic field applying means comprises an electromagnet including an iron core connected to said iron core arrangement of said magnetic phase shifter and a control gap formed in said magnet core, and said external magnetic field intensity regulating means comprises means disposed in said control gap for varying the reluctance.

5. A chopper control device as claimed in claim 1, wherein said external magnetic field applying means comprises a combination of a permanent magnet and a yoke connected to said iron core arrangement of said magnetic phase shifter, and said external magnetic field intensity regulating means comprises means for varying the effective area of said permanent magnet opposite to said yoke.

6. A chopper control device as claimed in claim 1, wherein said iron core arrangement includes a plurality of iron cores constituting a first closed magnetic path, said magnetic phase shifter further including an output winding, said control winding, feedback winding and output winding each being wound around a portion of said first closed magnetic path, means for applying an output rectangular wave produced from said output winding to said chopper so as to form a chopper-off signal utilizing the leading edge of said output rectangular wave and to form a chopper-on signal utilizing the trailing edge of said output rectangular wave to thereby control the duty cycle of said chopper, said means associated with said iron core arrangement being associated with said iron core of said magnetic phase shifter for applying an external magnetic field thereto through a second closed magnetic path associated with said first closed magnetic path.

* * * * *